United States Patent Office 3,455,963
Patented July 15, 1969

3,455,963
PROCESS FOR THE EXTRACTION OF CITRACONIC ACID
Pierre Guillermard and Paul Juston, Chauny, Aisne, and Yves Detuncq, Bois-Guillaume, France, assignors to Produits Chimiques Pechiney-Saint-Gobain, Neuilly-sur-Seine, France
No Drawing. Filed June 24, 1966, Ser. No. 560,118
Claims priority, application France, June 30, 1965, 22,921
Int. Cl. C07d 5/00; C07c 59/12, 59/16
U.S. Cl. 260—346.8           5 Claims

ABSTRACT OF THE DISCLOSURE

A process for the extraction of citraconic acid when in the presence of other organic carboxylic acids in which the system is heated in the presence of an organic solvent having a boiling point below 140° C. and in which the other carboxylic acids are insoluble while the citraconic acid and anhydride are soluble, separating the solvents present in the system and then distilling off the solvent from the solute to yield citraconic anhydride.

---

This invention relates to a process for the extraction or recovery of citraconic acid from solutions or from mixtures containing the same and to the extracted citraconic acid. It relates more specifically to the method for the extraction of citraconic acid from aqueous solutions or mixtures which also contain other organic polyacids.

Di-acids, particularly maleic and phthalic acids, are generally prepared by the oxidation of hydrocarbons in the presence of catalysts. The oxidation leads to the formation of gaseous products containing the desired acids or their anhydride derivatives which it is desirable to recover. In accordance with some of the processes for recuperation, the gaseous oxidation products are passed through a solvent, or water, or an aqueous solution of the acid. According to other processes, a part of the anhydride and/or the acid is condensed and the residual gases are extracted with water or with a solvent. In such other processes, the acid or the anhydride is collected in a solid or liquid state which is usually contaminated by other acids which require elimination. In any event, an aqueous solution containing different acids is obtained. The extraction of the different acids or anhydrides from this type of solution is very difficult. These solutions contain products of side reactions and byproducts which are of value and which are often desirable to recover.

A simple and inexpensive method for the extraction or recuperation of di-acids, and particularly citraconic anhydride, from the mixtures or solutions of organic acids has been found and it is an object of this invention to produce and provide a method for achieving same and it is a related object to product citraconic acids and anhydrides by the process hereinafter described.

In accordance with the practice of this invention, the process of extraction or recuperation of citraconic anhydride from solutions or mixtures containing citraconic acid with other organic di-acids or polyacids comprises heating the material to reflux temperature in the presence of a solvent and in the absence of a catalyst. For this purpose, use is made of a solvent having a boiling point below 140° C. A solid is formed which is separated as by filtration and the solute is treated to expel the solvent and recover the citraconic anhydride.

By way of variation, after elimination of the solvent, the citraconic acid is submitted to a distillation under vacuum.

The primary object of this invention resides in the application of the aforementioned process to the separation of citraconic anhydride from the mixture of citraconic acid with other acids, especially dicarboxylic acids such as maleic acid, fumaric acid, succinic acid, itaconic acid, measconic acid, phthalic acid and the like.

The invention also has for its object the extraction of citraconic anhydride from the residual liquors obtained in the process of oxidation of hydrocarbon derivatives and particularly from the aqueous residues formed in the fabrication of phthalic and maleic acids from o-xylene, toluene, methylnaphthalene, alone or mixed with naphthalene.

According to a characteristic of the process of the invention in the treatment of aqueous residues from the fabrication of maleic acid, the major part of the maleic acid is first precipitated, by known means such as crystallization.

The invention also relates to the application of the process to the recovery of citraconic anhydride from waste or aqueous residues from the fabrication of fumari acid by isomerization from solutions of maleic acids, and particularly those issued from the fabrication of phthalic anhydride. For the treatment of the waste waters, in accordance with the practice of this invention, it is advantageous first to concentrate the solutions to enrich them in citraconic acid.

As the solvent, use can be made of hydrocarbons, such as hexane and higher hydrocarbon homologs, benzene, toluene, chlorinated hydrocarbons such as chlorobenzene, trichloroethane, dichloroethane, and homologs thereof. It is also possible to make use of a mixture of these solvents. Solvents having a boiling point higher than 140° C. can be employed if they form an azeotrope having a boiling point lower than 90° C. but use of such solvent systems is very difficult.

The following examples are given by way of illustration, but not by way of limitation, of the practice of this invention:

EXAMPLE 1

A mixture of 116 g. of maleic acid and 130 g. of citraconic acid with 600 cm.$^3$ of benzene is heated for 4 hours in a Dean and Stark apparatus. Water is distilled off during the heating step. After cooling, the reaction medium is filtered to remove crystals that are formed and to leave the benzene solution as the filtrate. The benzene is distilled from the solution and the residue is distilled under vacuum (90°/10 mm. Hg). A product of 110 g. of citraconic anhydride is secured which is analyzed to contain 4.5% by weight of maleic anhydride. The crystals collected on the filter, after drying, represent 109.6 g. of pure crystallized maleic acid which is free of citraconic acid.

The free acidity of the citraconic acid is 0.1% calculated on citraconic acid.

In a parallel test, carried out under the same conditions, with 116 g. of maleic acid alone, 115.4 g. of the acid are collected as insoluble crystals in the benzene. In another test carried out with 130 g. of citraconic acid, 110 g. of distilled citraconic acid anhydride are obtained (corresponding to 127.8 g. of citraconic acid). A small amount of citraconic acid was lost with the water during dehydration (0.3 g.) and another portion was lost with the benzene during the distillation (0.9 g.).

EXAMPLE 2

A mixture of 116 g. of maleic acid and 32.5 g. of citraconic acid are treated, as in Example 1, with 375 cm.$^3$ of benzene.

Maleic acid crystals are collected on the filter. After drying, the maleic acid equals 115.2 g. The quantity of the recovered citraconic anhydride is 27.1 g. The crystallized maleic acid is free of traces of citraconic acid.

EXAMPLE 3

In a column for azeotropic distillation, 352 g. of a 70% solution containing an equimolecular mixture of maleic acid and citraconic acid (130 g. each) are treated with 525 g. of benzene, as in Example 1.

When the water has been eliminated, 110.2 g. (94.5% by weight) of maleic acid are collected on the filter as crystals. The benzene is distilled off of the filtrate and the citraconic acid is submitted to a distillation under vacuum to yield 112.4 g. of citraconic anhydride. Titration indicates the presence of 5% maleic anhydride in the product.

EXAMPLE 4

In a 20 liter container provided with an agitator, a thermometer and a condenser which is connected to a collecting flask of 1 liter capacity for the separation and decantation of water, a reaction product is introduced to substantially fill the container with 9 liters of benzene and 5 kg. of a solution containing 2.2 kg. of citraconic acid (corresponding to 1.895 kg. of anhydride), 0.228 kg. of fumaric acid, 0.290 kg. of phthalic acid, 0.290 kg. of phthalide, 0.070 kg. of maleic acid, 0.145 kg. of benzoic acid, 0.044 kg. of dimethylamleic acid, and other unidentified derivatives. The foregoing solution represents the residue of acid preparation. The solution is heated to reflux for 8 hours. The temperature of the reaction medium is 72° C. at the start and it rises to 82° C. towards the end of the reflux step. Heating is stopped. The quantity of water collected in the flask measures 0.660 kg.

After cooling, the liquid phase is syphoned off. 1.90 kg. of a gummy material, insoluble in benzene, remains at the bottom of the flask. This is eliminated by solution in hot water in the presence of caustic soda.

After distilling off the benzene, 2.732 kg. of raw citraconic acid is collected from the material that is syphoned off.

The citraconic anhydride is submitted to a distillation under vacuum, as described in Example 1, and the product gives the following analysis:

| | Percent |
|---|---|
| Citraconic anhydride | 98.7 |
| Maleic acid | 0.008 |
| Dimethylmaleic acid | 1.2 |

The foregoing sets forth particular examples illustrating the practice of the process of this invention.

It will be understood that the process can be employed in the treatment of any solid mixture or solution containing citraconic acid in the presence of one or more other di-acids or polyacids.

It will be understood that changes may be made in the details of formulation and reaction conditions.

We claim:

1. A process for the separation of a mixture of maleic and citraconic acids comprising the steps of heating the mixture of maleic and citraconic acids in the presence of an organic solvent having a boiling point below 140° C. and in which citraconic anhydride is soluble while the maleic acid and its anhydride are insoluble and in which said solvent is selected from the group consisting of hexane and higher homologs thereof, benzene, toluene, chlorobenzene, trichlorobenzene, dichloroethane and homologs thereof and other chlorinated hydrocarbons, separating the solids to leave the citraconic anhydride in solution in the solvent, and distilling off the solvent to yeld the citraconic anhydride.

2. The process as claimed in claim 1 in which the mixture of the maleic and citraconic acids and solvent are heated to reflux to remove water.

3. The process as claimed in claim 1 in which the maleic and citraconic acids are present in the form of a solution.

4. The process as claimed in claim 1 in which the maleic and citraconic acids are present in admixture in suspension.

5. The process as claimed in claim 1 in which the separation of the solids from the solvent solution is by way of filtration.

References Cited

UNITED STATES PATENTS

| 3,007,942 | 11/1961 | Burney et al. | 260—346.6 |
| 3,098,095 | 7/1963 | Knobloch et al. | 260—346.3 |
| 3,216,481 | 11/1965 | Henze | 159—47 |

ALEX MAZEL, Primary Examiner.

B. I. DENTZ, Assistant Examiner.

U.S. Cl. X.R.

260—537, 705